United States Patent Office 3,447,510
Patented June 3, 1969

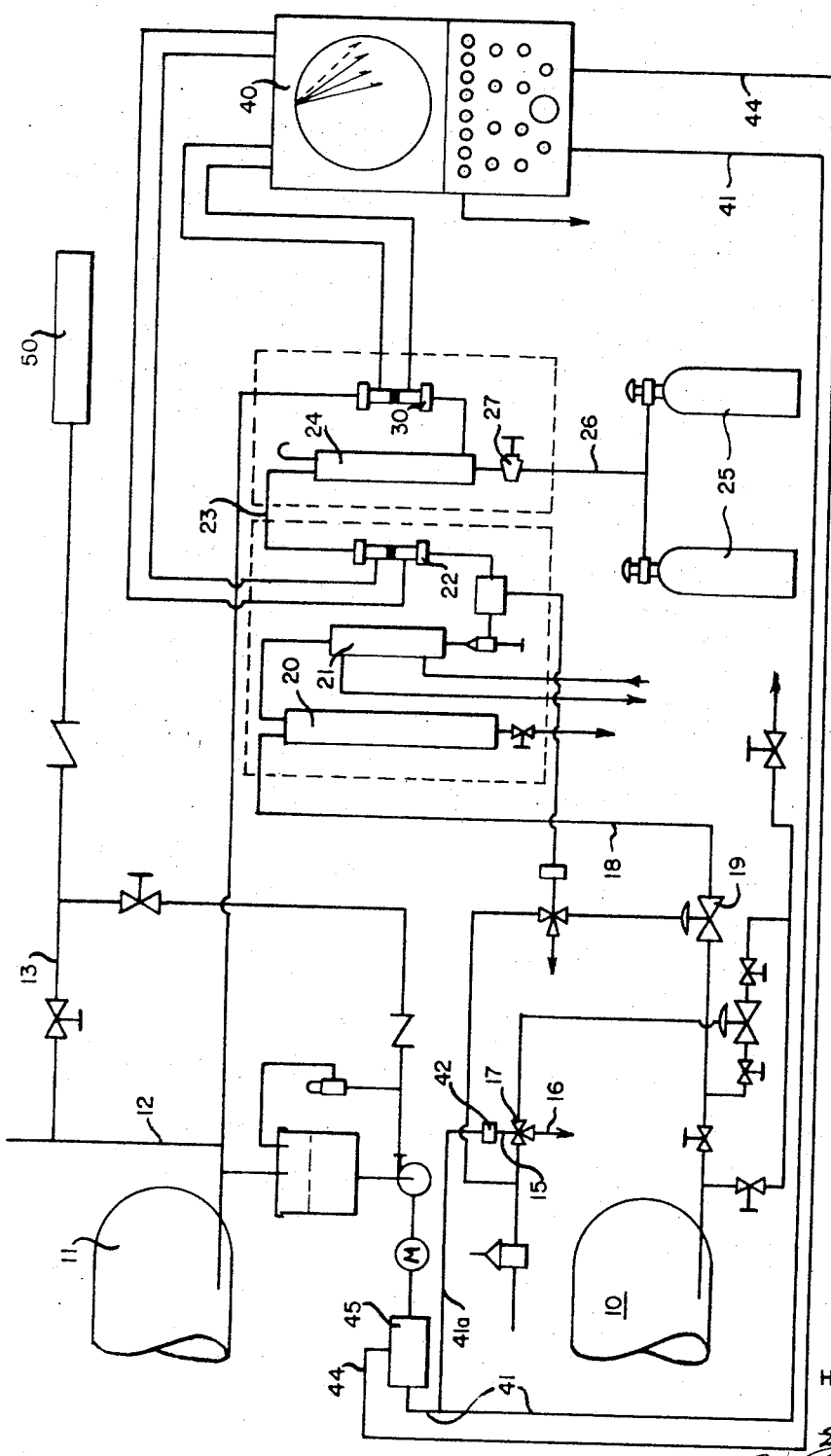

3,447,510
AUTOMATIC BOILER WATER CONDITIONING
Hubert M. Rivers, Upper St. Clair Township, Allegheny County, Pa., assignor to Calgon Corporation, a corporation of Pennsylvania
Filed May 31, 1967, Ser. No. 642,543
Int. Cl. F22b 37/48; F28g 9/00
U.S. Cl. 122—382                                    5 Claims

ABSTRACT OF THE DISCLOSURE

A method of controlling chemical feed and blow-down for a boiler by the steps of measuring each of the conductivity and the neutralized conductivity and controlling the blow-down by the measured conductivity and the chemical feed by the combined measured conductivity and the difference between measured and neutralized conductivity.

---

This invention relates to automatic boiler water conditioning and particularly to methods of automatically discharging accumulated solids from a boiler and feeding a chemical treating agent to the boiler to treat the make-up water introduced to maintain the water level after discharge of solids. The method of the present invention is particularly adapted for treatment of ship's boilers and the like.

In the operation of boilers it is the normal practice to control the concentration of boiler water solids by blow-down. Blowdown rids the boiler of water carrying a high concentration of solids (dissolved and suspended) which is, in turn, replaced by feedwater carrying much less solids, thus reducing the overall solids content of the boiler water. The solids which accumulate to form the high concentration of solids come from the treating chemicals which are added to provide protective alkalinity and scale prevention and natural solids which enter with the make-up water.

The make-up water customarily provided for steam generating boilers contains a variety of naturally-occurring contaminants which, if not removed or counteracted, will create difficulties of boiler maintenance and operation. Calcium and magnesium hardness, for example, tend to form adherent deposits on boiler surfaces which reduce their ability to pass heat; dissolved oxygen attacks boiler steel, producing corrosion in the form of pits; mineral solids left behind when water is converted to steam may sometimes concentrate sufficiently to create a foaming condition that causes boiler water to be entrained in the steam; etc. These properties of naturally-occurring contaminants in boiler feedwater are well known, as are also the hazards and the costs entailed by unscheduled outages, boiler repairs, chemical or mechanical boiler cleaning, and less efficient plant operation which result from improperly conditioned boiler water.

Some or all of the contaminants may be removed from the feedwater by chemical or mechanical means externally of the boilers. It has long been a general and widespread practice, particularly in feeding water for ships boilers to not only remove the contaminants prior to feeding water to the boiler, but also to add to the boiler water one or more specific treating chemicals whose function is to obviate the costly or otherwise undesirable effects of contaminants in the boiler feedwater. For example, a soluble phosphate salt may be used to counteract the scale-forming tendencies of calcium and its compounds; soluble silicates are sometimes used to prevent deposition of adherent magnesium compounds; sodium sulfite may be used to remove corrosive dissolved oxygen; an organic dispersive agent may be employed to render precipitated sludges more fluid, thereby expediting their removal through boiler blowdown and minimizing their tendency to lodge on heat transfer surfaces; an antifoam agent may be used to minimize the entrainment of boiler water in steam; sodium nitrate may be fed as a safeguard against intercrystalline cracking of boiler steel; and so on. The use of such water conditioning chemicals is considered essential to safe and economical operation of most boiler plants throughout the world today.

Ordinarily, the amount of a specific chemical that must be fed in a given period of time is proportional to the input of a particular feedwater contaminant plus the quantity of treating chemical necessarily removed through blowdown during that time interval. If the contaminants that require treatment were introduced into the boiler at a constant rate, and if the rate of blowdown removal were also uniform, then the feeding of optimum amounts of treating chemicals would present no problem. In the vast majority of boilers, however, blowdown rates and contaminant input rates are subject to considerable variaton, depending upon local operating conditions. This not only complicates greatly the task of feeding the proper amounts of treating chemicals, but it also intensifies the need to maintain optimum control over boiler water chemical conditions at all times. If, for any reason, insufficient amounts of treating chemicals are fed, then scale deposition, corrosion, steam contamination, or other difficulties may result. On the other hand, should the dosage of treating chemicals materially exceed that required for proper conditioning of the boiler water, the excesses of treating chemicals may themselves promote objectionable deposits, corrosion, or steam contamination; and treatment costs will be unnecessarily high. Therefore, in order that proper concentrations be maintained in the boiler water at all times, the rate of chemical addition must vary systematically in relation to all changes in the rate of contaminant input and the rate of blowdown withdrawal.

At the present time, as for many years in the past, chemical additions are generally regulated according to chemical tests made periodically on samples of water taken from the boiler. A specified residual of each treating chemical must be maintained in the boiler water to provide assurance that the desired chemical reactions will proceed to completion. Overtreatment, on the other hand, is unnecessarily costly and, as has been pointed out above, may result in offensive deposits, corrosion, or steam contamination. If tests reveal that the residual concentration of a particular treating chemical is above or below the desired control range, the chemical addition is accordingly decreased or increased within the period until the next sample is taken and tested. The chemical feed is, of course, dependent upon the operator's ability to predict what the chemical requirements will be during the interval before samples are tested again. Such manual control of chemical additions is practical only when the rates of contaminant input and blowdown withdrawal can be anticipated with reasonable accuracy between successive sampling periods. Quite frequently, however, normal but unpredictable fluctuations in make-up water composition, percent make-up, and, particularly, boiler load create wide variations in blowdown demand and the rate of contaminant input, making it difficult for the operator to accurately anticipate chemical requirements between one sampling period and the next. In such cases, the operator must choose one or the other of two alternative courses of action, both of which are undesirable—either he must accept the hazards and the boiler maintenance and operating difficulties that come with irregularities in boiler water chemical control, or he must assume the additional cost and inconvenience of increasing the frequency of sampling and testing the boiler water and manually adjusting the chemical feed rate.

I have invented a method and apparatus for maintaining proper boiler blowdown and water chemical concentrations at all times regardless of variations in boiler load, or the blowdown rate.

My invention provides a method of simultaneously treating input water to a boiler and regulating blowdown from said boiler by the steps of sequentially measuring both the conductivity of the water in the boiler and the conductivity of the boiler water after the ionized constituents have been reacted (hereinafter called neutralized conductivity) and thereafter simultaneously feeding water treating chemicals into the boiler and regulating the blowdown flow to maintain a predetermined conductivity in the boiler based upon said conductivities. I also provide an apparatus for use in a boiler system comprising means for measuring conductivity of water in the boiler system, means for measuring the conductivity of the boiler water after ionized constituents have been reacted, blowdown valve means, input chemical feed means to the water in the boiler, control means operated by the means for measuring conductivity of the boiler water actuating the blowdown valve means and control means operated by the means for measuring neutralized conductivity actuating the chemical feed means simultaneously or sequentially to blowdown the boiler and feed chemicals to maintain a pre-set conductivity in the boiler. In short, my invention provides for a method and apparatus such that both blowdown and treating chemical feed into the boiler are controlled by conductivity either of the boiler water or the neutralized conductivity or both to maintain the conductivity at a pre-set value, in such a way that an increase in conductivity will increase the blowdown and simultaneously or sequentially adjust the rate of feeding boiler treatment chemicals into the boiler. In this application, when I refer to "blowdown," I mean the water withdrawn from the boiler to remove contaminants introduced with the feedwater and concentrated in the boiler when water is evaporated to make steam. In effect, I feed treating chemicals in relation to the loss of chemicals through blowdown, thereby maintaining the required precision of control over boiler water concentrations. The chemicals may be fed into the make-up or feedwater lines or directly into the boiler.

The measurement of neutralized conductivity to provide an accurate measure of dissolved solids concentration may be accomplished by a method such as described in U.S. Patent 2,964,024.

In the foregoing general description I have set out certain objects, purposes and advantages of my invention. Other objects, purposes and advantages will be apparent from the following description and the accompanying drawings which show a purely illustrated embodiment of my invention in more or less diagrammatic fashion as used on shipboard.

Referring to the drawings I have shown the usual water drum 10 and steam drum 11 making up a boiler arrangement and having the usual outlets for steam (not shown) and inlets for feedwater 12 and treating chemicals 13 as well as an outlet 15 for blowdown with the usual line 16 and valve 17. A sampling line 18 is connected to the water drum 10 which may be provided with a valve 19 controlling flow of sample water through a sludge remover chamber 20 and cooler 21 before passing through a conductivity cell 22 where the conductivity of the water from the boiler is measured. The sample then passes through line 23 to a neutralizing or reacting chamber 24 where reaction chemicals stored in tanks 25 are fed through line 26 and valve 27 into chamber 24 to react with the ionized constituents of the water. From the reaction chamber 24 the water passes to conductivity cell 30 where the "neutralized" conductivity is measured. The two conductivity measurements are fed to a recorder regulator 40 of conventional form. The boiler water conductivity is caused by the regulator to generate a pneumatic signal in lines 41–41a which is a function of conductivity and which goes to controller 42 on blowdown valve 17. The two conductivity signals are jointly used to create a signal in line 43 which is a function of their difference, i.e. a differential conductivity signal, which signal is delivered through pneumatic line 44 to controller 45 which also receives the signal from line 41. The controller 45 is normally operated by the signal from line 41 but may be overridden by the signal from line 44 where the chemical feed is out of balance as indicated by the high differential in conductivity. It will be seen from the foregoing description that blowdown and chemical feed, once properly set can continue on an automatic basis solely from the impulses resulting from determining the two conductivities of boiler water before and after neutralization and using them to signal the blowdown and chemical treatment feed.

In the practice of my invention I carry the test sample water from the conductivity cell 30 back to the steam drum 11 or the chemical feed tank 50 so that a continuous sampling can be carried out without detrimentally affecting the water composition of the system. This provides a uniquely advantageous practice and a degree of control not heretofore possible.

While I have illustrated and described a present preferred embodiment of my invention, it will be understood that this invention may be otherwise embodied within the scope of the following claims.

I claim:

1. The method of controlling the nature and concentration of chemicals in a boiler comprising the steps of separately measuring both the conductivity of the water in the boiler and the neutralized conductivity thereof, controlling the blowdown of said boiler with a signal governed by the neutralized conductivity of the water and controlling the feed of chemical treatment with a signal which is produced from a signal governed by the neutralized conductivity as modified by a signal governed by the difference between the measured conductivity and the neutralized conductivity.

2. The method of claim 1 wherein a treatment sample is removed from the boiler and measured for conductivity and neutralized conductivity and then returned to said boiler.

3. The method of claim 1 wherein the signals controlling the blowdown and chemical feed are pneumatic signals.

4. Boiler apparatus comprising a boiler, a blowdown conduit on said boiler, valve means in said conduit, opening and closing the same, a chemical feed means connected to said boiler for delivery of treating chemicals thereto, a means for measuring the conductivity of the water in said boiler, means for measuring the neutralized conductivity of the water in said boiler, a regulator means delivering a first signal governed by said neutralized conductivity and a second signal governed by the difference between said measured conductivity and the neutralized conductivity, control means on the valve means responsive to said first signal for blowing down said boiler and a control means on the chemical feed means responsive to the combined first and second signal means.

5. A boiler apparatus as claimed in claim 4 wherein means are provided for withdrawing a sample of water from said boiler successively to the means for measuring conductivity and the means for measuring neutralized conductivity and returning the sample after measurement to the boiler.

References Cited

UNITED STATES PATENTS

| | | | |
|---|---|---|---|
| 2,964,024 | 12/1960 | Kaufman et al. | 122—382 |
| 2,989,037 | 6/1961 | Filippino et al. | 122—379 |
| 3,139,071 | 6/1964 | Rivers | 122—382 |

CHARLES J. MYHRE, *Primary Examiner.*